(12) United States Patent
Hwang et al.

(10) Patent No.: US 7,471,594 B2
(45) Date of Patent: Dec. 30, 2008

(54) INFORMATION STORAGE MEDIUM, RECORDING AND/OR REPRODUCING APPARATUS, AND RECORDING AND/OR REPRODUCING METHOD

(75) Inventors: Sung-hee Hwang, Seoul (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 857 days.

(21) Appl. No.: 11/080,399

(22) Filed: Mar. 16, 2005

(65) Prior Publication Data

US 2005/0281178 A1    Dec. 22, 2005

(30) Foreign Application Priority Data

Jun. 22, 2004   (KR) ...................... 10-2004-0046701

(51) Int. Cl.
    *G11B 21/12* (2006.01)
(52) U.S. Cl. ................ 369/30.03; 369/47.14; 369/53.17
(58) Field of Classification Search ............... 369/30.03, 369/47.14, 53.17
    See application file for complete search history.

(56) References Cited

U.S. PATENT DOCUMENTS

| | | | | |
|---|---|---|---|---|
| 6,189,118 | B1 * | 2/2001 | Sasaki et al. | 714/710 |
| 6,377,524 | B1 * | 4/2002 | Ko | 369/47.14 |
| 6,418,100 | B1 * | 7/2002 | Park et al. | 369/47.14 |
| 6,469,978 | B1 * | 10/2002 | Ohata et al. | 369/275.3 |
| 6,526,522 | B1 * | 2/2003 | Park et al. | 714/8 |
| 6,760,288 | B2 | 7/2004 | Ijtsma et al. | |
| 6,785,839 | B2 | 8/2004 | Ko et al. | |
| 2003/0137909 | A1 | 7/2003 | Ito et al. | |
| 2004/0017753 | A1 * | 1/2004 | Lee et al. | 369/53.17 |

FOREIGN PATENT DOCUMENTS

| | | |
|---|---|---|
| EP | 1141956 A1 | 10/2001 |
| EP | 1148497 A1 | 10/2001 |
| JP | 2003-249022 A | 9/2003 |
| JP | 2003-288759 A | 10/2003 |

OTHER PUBLICATIONS

Search Report issued in International Application No. PCT/KR2005/001859 on Sep. 27, 2005.

* cited by examiner

*Primary Examiner*—Marvin M Lateef
*Assistant Examiner*—Brenda Bernard
(74) *Attorney, Agent, or Firm*—Stein, McEwen & Bui, LLP (57) ABSTRACT

An information storage medium, a recording and/or reproducing apparatus and a recording and/or reproducing method area, the information storage medium including an access control area for recording access control data (ACD) having common information set so that even a recording and/or reproducing apparatus that cannot recognize a predetermined function applied to the medium can control access to the medium, the ACD including ACD attribute information providing information indicating whether or not to delete the ACD when the medium is re-initialized. According to the information storage medium, when the disc is re-initialized, by recording common information in relation to disc access control which even a drive system with a different standard can know, a drive system that cannot recognize a function applied to the disc as well as a drive system that can recognize the function can perform an appropriate operation by referring to this common information, such that compatibility of the disc can be improved.

32 Claims, 10 Drawing Sheets

| b1 | b0 |
|---|---|
| ACD BLOCK STATE INFORMATION ||
| 0 | 0 |
| 0 | 1 |
| 1 | 0 |
| 1 | 1 |

| ACD_ID (1 Byte) (411) | ATTRIBUTE INFORMATION OF ACD ITSELF INCLUDED IN ACD_ID |
|---|---|
| 0 ~ 99 | ACD THAT SHOULD BE DELETED WHEN RECOGNITION OF ACD IS IMPOSSIBLE IN RE-INITIALIZATION |
| 100 ~ 199 | ACD THAT SHOULD NOT BE DELETED WHEN RECOGNITION OF ACD IS IMPOSSIBLE IN RE-INITIALIZATION |
| 200 ~ 255 | ACD THAT MAY OR MAY NOT BE DELETED WHEN RECOGNITION OF ACD IS IMPOSSIBLE IN RE-INITIALIZATION (DON'T CARE) |

FIG. 8

| ATTRIBUTE INFORMATION OF ACD ITSELF (512) or (612) | | MEANING |
|---|---|---|
| 0 | 0 | ACD THAT DON'T CARE WHETHER OR NOT ACD IS DELETED IN RE-INITIALIZATION |
| 0 | 1 | ACD THAT SHOULD BE DELETED IN RE-INITIALIZATION |
| 1 | 0 | ACD THAT SHOULD NOT BE DELETED IN RE-INITIALIZAITON |
| 1 | 1 | RESERVED |
| b1 | b0 | |

INFORMATION STORAGE MEDIUM, RECORDING AND/OR REPRODUCING APPARATUS, AND RECORDING AND/OR REPRODUCING METHOD

CROSS-REFERENCE TO RELATED APPLICATIONS

This application claims the priority of Korean Patent Application No. 2004-46701, filed on Jun. 22, 2004 in the Korean Intellectual Property Office, the disclosure of which is incorporated herein in its entirety by reference.

BACKGROUND OF THE INVENTION

1. Field of the Invention

The present invention relates to a disc, and more particularly, to an information storage medium, a recording and/or reproducing apparatus, and a recording and/or reproducing method by which a disc can be re-initialized so that recording and/or reproducing compatibility can be guaranteed.

2. Description of the Related Art

Due to the recent developments of optical disc technologies and semiconductor technologies, new functions are frequently added after a standard for an optical system, including an optical drive system and an optical disc, is established. In this case, the standard should be continuously updated.

Figure 1:
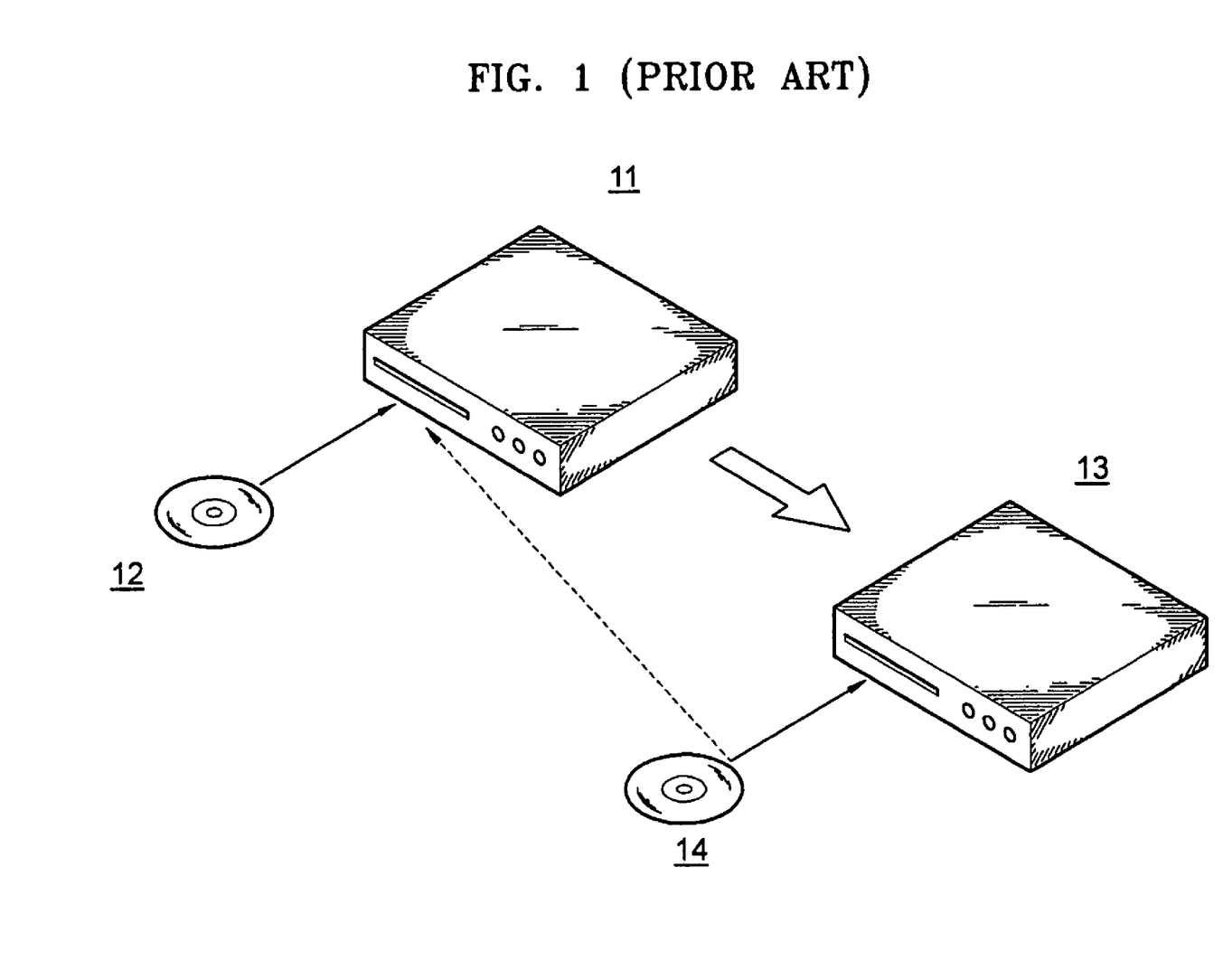
FIG. 1 is a reference diagram for explaining compatibility between different standard discs according to the conventional technology.

FIG. 1 is a reference diagram for explaining a problem according to the conventional technology. Referring to FIG. 1, assuming that a conventional standard is referred to as an 'old' standard and a standard updated by adding a new function is referred to as a 'new' standard, an old standard disc 12 is made to operate in an old standard drive system 11 and a new standard disc 14 is made to operate in a new standard drive system 13.

Due to the added function, the old standard and the new standard may or may not be compatible for recording and/or reproducing data. The recording and/or reproducing compatibility of the two standards indicates that the old standard disc 12 used in the old standard drive system 11 can also be used in the new standard drive system 13 for data recording and/or reproducing. Also, it indicates that the new standard disc 14 used in the new standard drive system 13 can also be used in the old standard drive system 11 for data recording and/or reproducing.

In order to guarantee mutual recording and/or reproducing compatibility between the two standards, when the new standard disc 14 to which the new functions is applied is loaded on the old standard drive system 11, the old standard drive system 11 needs to provide an appropriate treatment for the new function. For this, when the old standard is set up, an appropriate treatment for future addition of a new function should be prepared.

In addition, this appropriate treatment should be a generalized one that can be applied to the new standard, because it should be able to be applied even when the new standard is updated to a newer standard by adding another new function.

Accordingly, in order for a series of different standards according to this periodic addition of new functions to be mutually compatible for recording and/or reproducing data, preparation for the addition of new functions should be performed from the beginning when the standard is set up. For this, a rule by which a drive system should operate for a function that is known to a current standard, and a rule by which the current drive system should operate for a function to be added in the future and which is not known to the current standard need to be prepared. That is, when a future standard is set by adding a new function to a current standard, if a drive system for the future standard stores an operation that should be performed for the new function by a drive system for the current standard, even when a future disc having the new function added to the current standard is loaded on a current standard drive system, according to the stored information, the current standard drive system can read the information stored on the disc and perform the operation for the new function. In other words, the future standard drive system can inform the current drive system how to operate the disc to which the new function is applied, even though the current standard drive system does not know the new function added to the future standard.

When a disc is re-initialized in order to initialize the disc after using it for a while, a method is required by which the disc can be re-initialized such that various types of drive systems can use the disc though there are unrecognizable functions applied to the disc.

SUMMARY OF THE INVENTION

Aspects of the present invention provide an information storage medium, a recording and/or reproducing apparatus, and a recording and/or reproducing method for improving compatibility of a disc even in different standard drive systems.

Additional aspects and/or advantages of the invention will be set forth in part in the description which follows and, in part, will be obvious from the description, or may be learned by practice of the invention.

According to an aspect of the present invention, there is provided an information storage medium wherein an access control area for recording access control data (ACD) having common information, which is set so that even a recording and/or reproducing apparatus that cannot recognize a predetermined function applied to the medium can control access to the medium, is disposed and the ACD includes ACD attribute information providing information indicating whether or not to delete the ACD when the medium is re-initialized.

In an aspect of the present invention, the ACD attribute information includes at least one of information indicating that the ACD should be deleted when the medium is re-initialized, information indicating that the ACD should not be deleted, or information indicating that deletion of the ACD does not matter.

In an aspect of the present invention, the ACD attribute information is fixedly determined when the ACD is generated, or may be changeable while the ACD is used.

In an aspect of the present invention, the ACD attribute information is included in an identifier (ACD_ID) for identifying a predetermined function indicated by the ACD such that the ACD attribute information may be fixed or updated.

In an aspect of the present invention, the ACD attribute information is included in common information of the ACD such that the ACD may be changed.

In an aspect of the present invention, when the medium is re-initialized, if the ACD attribute information of ACD that is unrecognizable indicates that the unrecognizable ACD should be deleted, the unrecognizable ACD may be deleted in the access control area, and if the ACD attribute information of ACD that is unrecognizable indicates that the unrecognizable ACD should not be deleted, the unrecognizable ACD may not be deleted.

According to another aspect of the present invention, there is provided an apparatus for recording and/or reproducing data including: a writing/reading unit recording data on or reading data from an information storage medium wherein an access control area is disposed for recording ACD having common information, which is set so that even a recording and/or reproducing apparatus that cannot recognize a predetermined function applied to the medium can control access to the medium; and a control unit controlling the writing/reading unit such that the ACD including ACD attribute information providing information indicating whether or not to delete the ACD during a re-initialization operation of the medium is recorded on the medium.

According to another aspect of the present invention, there is provided a method of recording and/or reproducing data including: on an information storage medium wherein an access control area for recording ACD having common information, which is set so that even a recording and/or reproducing apparatus that cannot recognize a predetermined function applied to the medium can control access to the medium, is disposed, recording the ACD including ACD attribute information providing information indicating whether or not to delete the ACD during a re-initialization operation of the medium

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When a writable information storage medium is loaded on a drive system and the medium is determined to be empty, the medium will be initialized.

After the initialization, while the medium is used in a drive system A or a drive system B, access control data (ACD) having common information which is set so that a recording and/or reproducing apparatus that cannot recognize a predetermined function applied to the medium can control access to the medium will be recorded on the medium according to a user request or to fit the version of each drive system.

If the ACD that drive system A does not recognize but drive system B recognizes is recorded on the medium and the medium is loaded on drive system A, then drive system A uses the medium by referring to information defining an operation for a function that is not known to drive system A and is stored in the common information of the ACD.

When a user re-initializes the medium loaded on the drive system A, among the ACD items recorded on the medium, ACD items that are known to the drive system A can be modified or deleted according to the user's request or the drive system. However, ACD items that are not recognized by the drive system A are difficult for the drive system A to modify or delete. These ACD items are set by drive system B, not by the drive system A. That is, when the ACD is first recorded by the drive system B, if the ACD is one that should not be deleted by the drive system A, the ACD should not be deleted even in a re-initialization process. Also, if the ACD can be continuously used even though the ACD is a known function, it is not necessary to delete the ACD.

According to aspects of the present invention, in order to determine whether the ACD should be deleted in a re-initialization process, or should not be deleted and maintained as is, or does not affect the use of the medium after the re-initialization whether or not the ACD is deleted, a concept of attribute information of the ACD itself is introduced.

According to an aspect of the present invention, attribute information of the ACD indicating whether the ACD should be deleted or not or whether deletion of the ACD does not matter in a re-initialization process is generated and stored in the ACD. When ACD for a new function is currently added and if the ACD is not supported by a past drive system or a current drive system, then the ACD is unrecognizable.

When ACD for a new predetermined function is added the characteristic of both a drive system presently manufactured and an old drive system are known. Accordingly, when a medium on which the ACD for the new predetermined function is recorded is loaded on a drive system that does not recognize the ACD (i.e., including both the old drive system and a current drive system that does not support the ACD) and re-initialized, ACD attribute information indicating whether the ACD should be deleted or not or whether deletion of the ACD does not matter can be provided when the current ACD is made.

Also, by assigning a unique number, such as ACD_ID, for identification to this ACD attribute information, the ACD attribute information can be provided in a fixed manner so that modification of the information is impossible, or the ACD attribute information can be provided such that while the medium is used in a drive system that knows this ACD, when information in the ACD is set by a user or the drive system, the information in the ACD can be modified to fit the intention of the user or the characteristic of the drive system.

In order to allow this ACD attribute information to be changed, for example, a field for this ACD attribute information can be prepared in common information defining operations for ACD functions that are not known.

Figure 2:
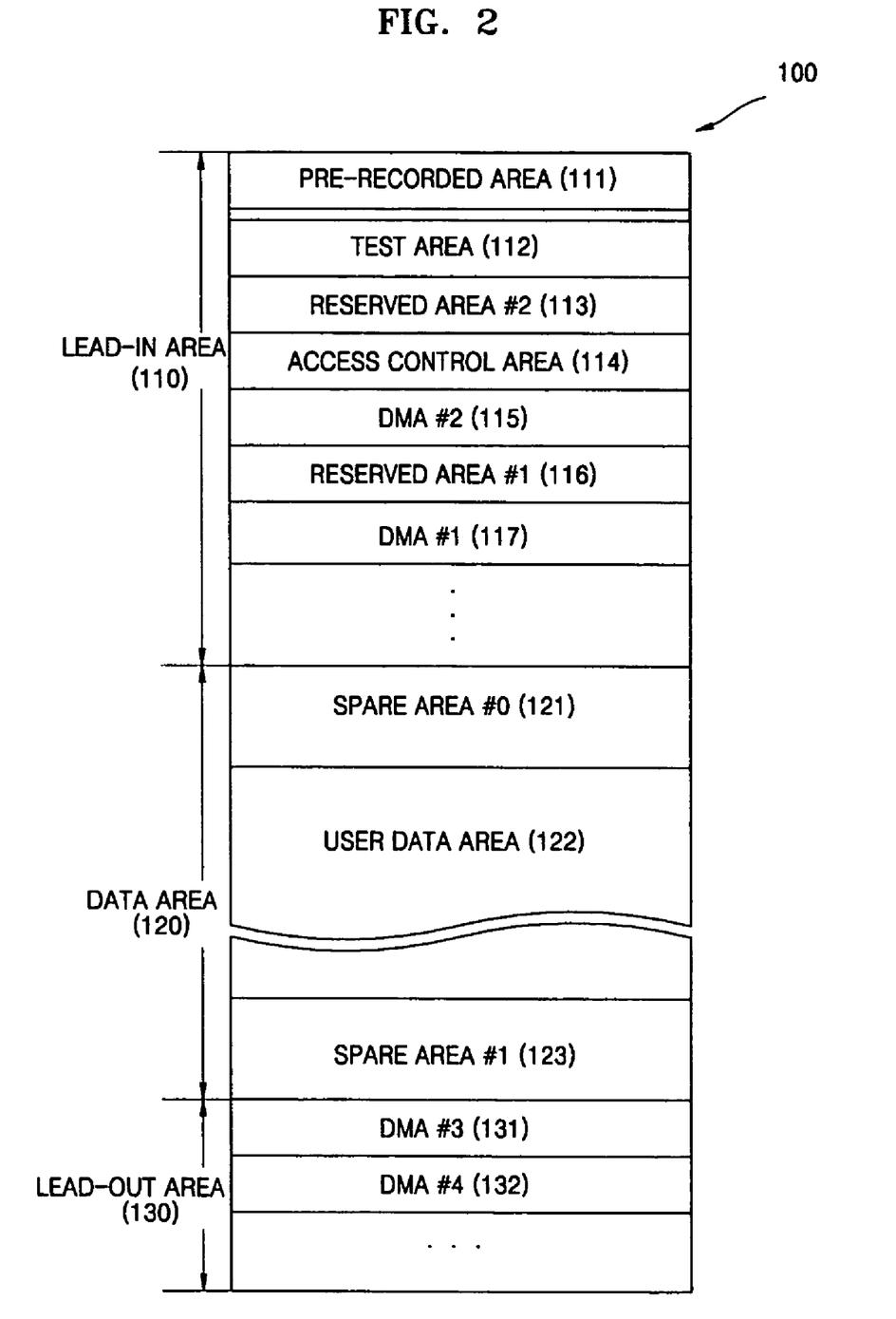
FIG. 2 is a diagram of the structure of an optical recording information storage medium according to an embodiment of the present invention.

FIG. 2 is a diagram of the structure of a disc to which aspects of the present invention are applied. Referring to FIG. 2, on the disc 100, a lead-in area 110, a data area 120, and a lead-out area 130 are continuously disposed.

The lead-in area 110 includes a pre-recorded area 111 in which predetermined data is recorded in advance when the disc is manufactured and which is used only for reproduction, a test area 112, reserved area #2 113, an access control area 114, DMA#2 115, reserved area #1 116, and DMA #1 117. The test area 112, reserved area #2 113, the access control area 114, DMA #2 115, reserved area #1 116, and DMA #1 117 are areas in which data can be recorded and modified.

In the pre-recorded area 111, information on the disc itself is recorded in advance when the disc is manufactured. For example, a disc ID such as a disc manufacturing number identifying a disc is recorded.

The test area 112 is an area in which write power and other parameters can be tested in order to record data on the disc 100 in an optimal recording condition.

Reserved areas #1 and #2 116 and 113 are areas reserved for future standard extensions. That is, when a standard for a current drive system is set up, by considering scalability in the future, one or more reserved areas can be thus disposed in advance in a lead-in area and/or a lead-out area, to secure in advance an area which is not used in a current drive system but can be used for a future drive system.

The access control area 114 is an area in which information defining operations of a drive system for new functions to be added in the future is recorded. That is, in the access control area 114, common information that enables even a drive system that does not know a new function to perform control of access to this disc 100 is recorded. The access control area 114 will be explained in detail with reference to FIG. 4.

DMA #1 117 and DMA #2 115 are defect management areas in which information on a defect occurring in the user data area 122 is recorded. This will be explained in detail with reference to FIG. 3A.

The data area 120 includes spare area #0 121, a user data area 122, and spare area #1 123. The user data area 122 is an area in which user data is recorded. Spare areas #0 121 and #1 123 are areas prepared for a replacement block replacing a defect block occurring in the user data area 122. Spare areas #0 121 and #1 123 are disposed in a data area 120 when a disc is initialized or re-initialized. The lead-out area 130 includes DMA #3 131 and DMA#4 132.

Figure 3A:
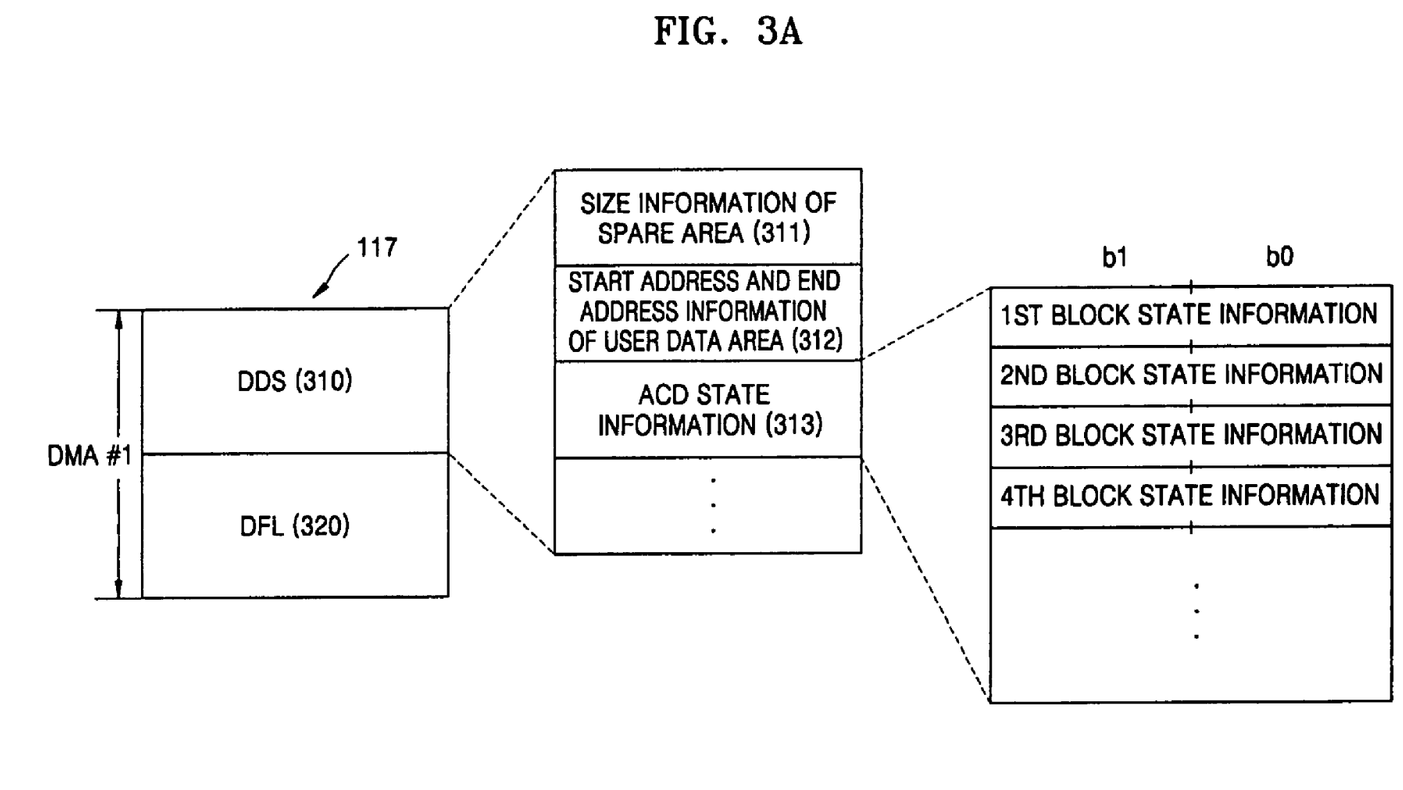
FIG. 3A is an example of a detailed diagram of the structure of DMA #1 shown in FIG. 2.

FIG. 3A is a detailed diagram of the structure of DMA #1 117 shown in FIG. 2. Referring to FIG. 3A, DMA #1 117 includes DDS 310 and DFL 320. DFL 320 is a defect list and includes information on a defect occurring in a user data area. For example, a defect list includes address information of a defect block occurring in a user data area, address information of a replacement block replacing this defect block, and information on the state of a defect.

DDS 310 is a disc definition structure and includes information on disc management. That is, DDS 310 is information which is recorded when the disc is initialized or re-initialized, and includes spare area size information 311, start address and end address information 312 of a user data area, and ACD state information 313. When the disc is initialized or re-initialized, the drive system allocates at least one spare area in a data area, determines a user data area in which user data is recorded, in a data area, and then records information on the allocations in DDS 310.

Figure 3B:
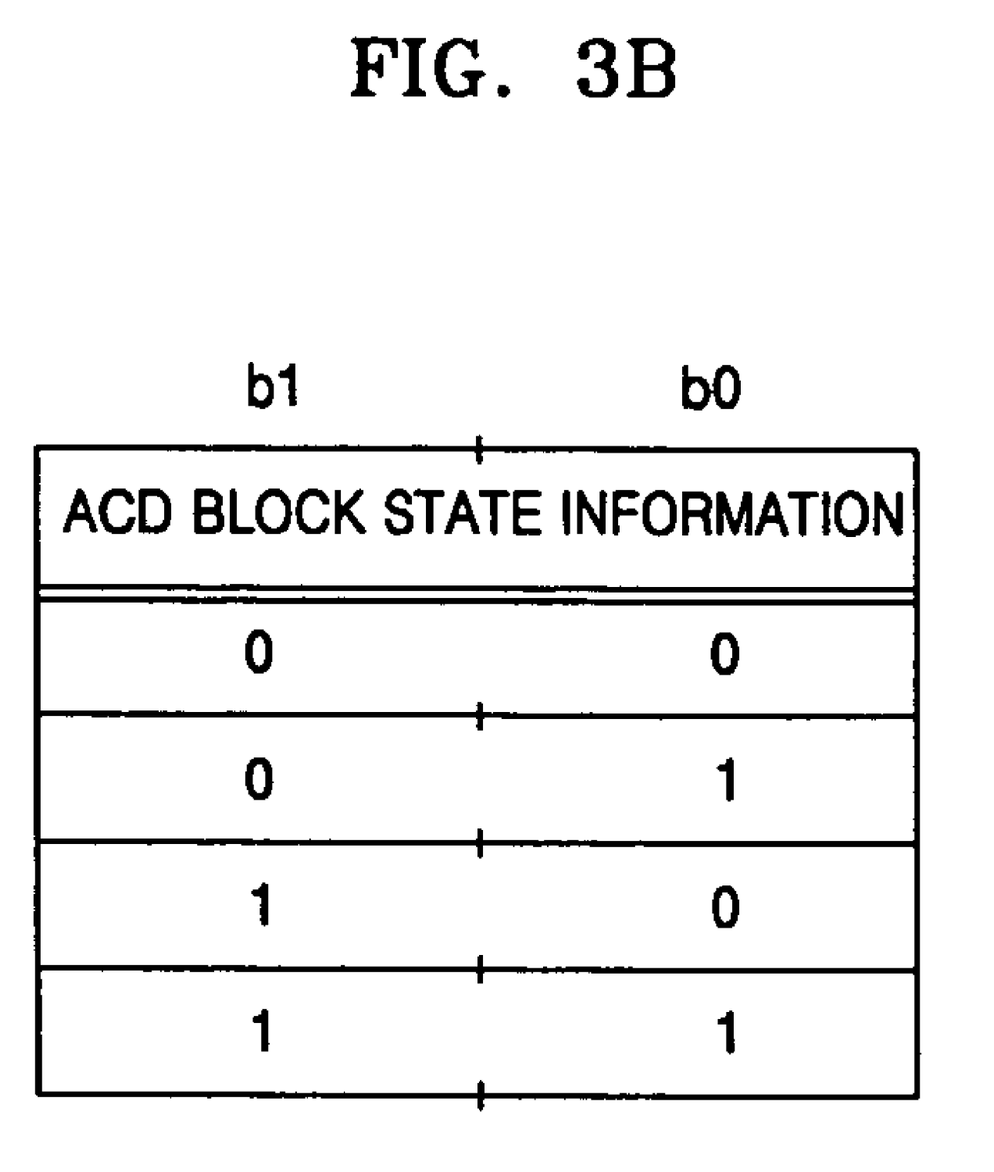
FIG. 3B is an example of access control data (ACD) block state information shown in FIG. 3A.

ACD state information 313 indicates information on a recording state or a defect state of an access control data (ACD) block in which each ACD item is recorded in an access control area. Referring to FIGS. 3A and 3B, state information of each ACD block is formed by 2 bits.

FIG. 3B is a reference diagram for explaining states included in ACD state information according to an embodiment of the present invention. Referring to FIG. 3B, the state of each ACD block is expressed by 2 bits and includes 4 states, that is, "00", "01", "10", and "11".

"00" indicates an ACD block that can be used and in which ACD can be recorded.

"01" indicates a defect block, and more specifically, indicates any one of a state of an ACD block which is found to be defective while the ACD block is recorded in an access control area, or a state of the ACD block in which invalid ACD is recorded.

"10" indicates an ACD block in which valid ACD is recorded though the ACD block is found to be defective while ACD data recorded in an access control area is reproduced.

"11" indicates an ACD block in which valid ACD is recorded.

Thus, when state information of each ACD block of an access control area (ACA) for recording ACD is recorded on DDS 310 and managed, the ACD blocks can be managed effectively. An ACD block which is physically recorded in an ACA has an ACD_ID, and from this ACD_ID, a drive system can know the function of the corresponding ACD. When an ACD block is reproduced, when the disk is loaded on a drive, the drive detects a location where a valid ACD block is recorded, from state information of each ACD block in DDS 310, and reproduces the valid ACD blocks.

Before re-initialization, if state information of an ACD block in DDS 310 indicates that valid ACD is recorded, the block is a valid ACD block. After re-initialization, since ACD recorded in the ACD block is not needed any more, state information should be changed in order to indicate that valid ACD is not recorded in the state information of the ACD block any more and the ACD block can be used for recording new ACD in the future. If state information on a valid ACD block in DDS 310 is not changed during re-initialization, a drive will reproduce an ACD block from state information indicating that a valid ACD block is recorded in DDS 310 after the re-initialization process. Accordingly, when a disc is re-initialized the state information of an ACD block needs to be updated. Also, if an ACD becomes invalid due to re-initialization, a drive system may receive incorrect information from the ACD and cause a problem.

Accordingly, in the re-initialization process, in addition to changing the state information on an ACD block in DDS 310, it is also needed to physically delete an entire ACD block or only the ACD_ID of an ACD block, by re-recording values such as "00h" or "FFh" in the ACD block or the ACD_ID.

Figure 4:
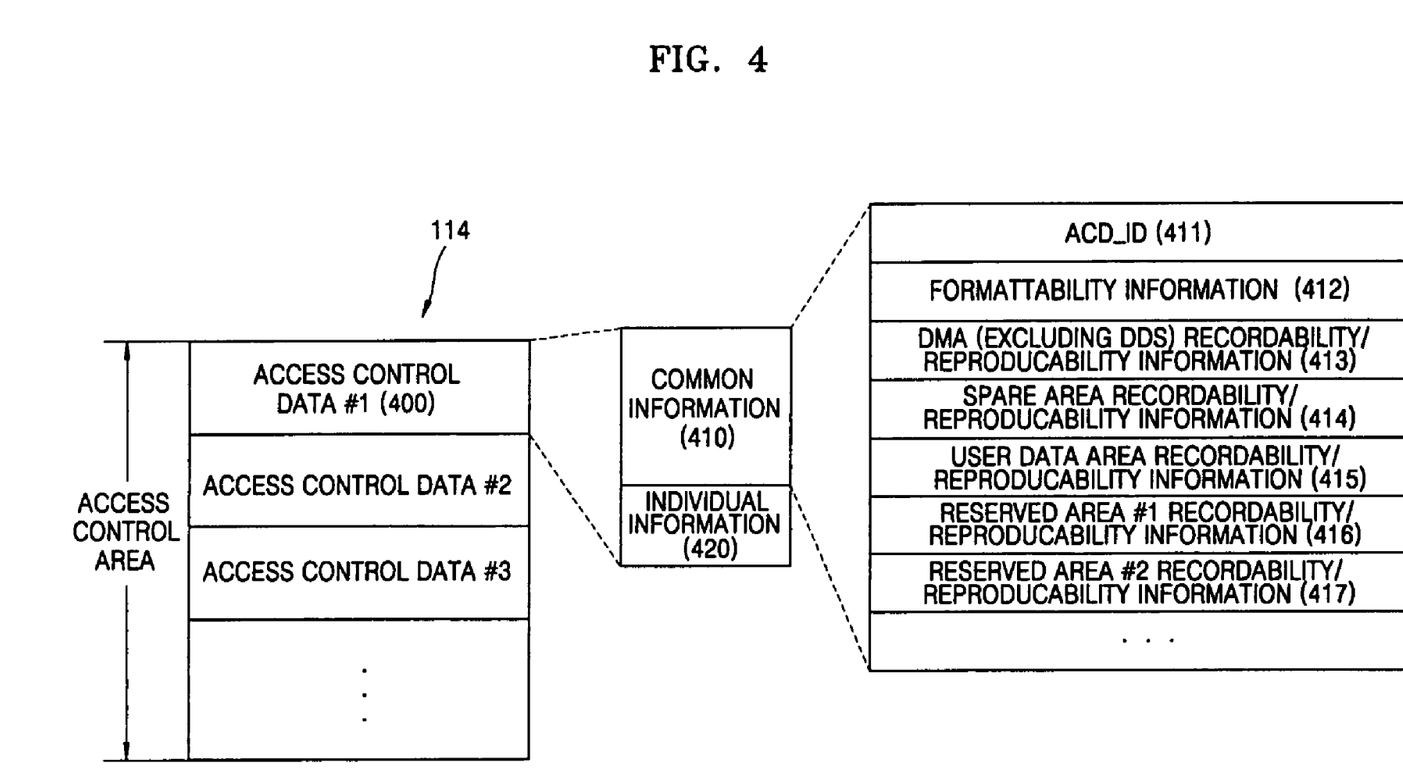
FIG. 4 is a detailed diagram of the structure of an access control area shown in FIG. 2 and showing a first embodiment of access control data according to the present invention.

FIG. 4 is a detailed diagram of the structure of an ACA shown in FIG. 2 and shows a first embodiment of ACD. In the first embodiment of ACD, ACD attribute information is included in an ACD_ID for identification. That is, the ACD_ID identifies which function this ACD is about, and also identifies what this ACD attribute information indicates. Referring to FIG. 4, an ACA 114 includes ACD #1, ACD #2, ACD #3 . . . . The ACA 114, as described above, is an area in which common information for control of access to this disk according to a standard is recorded, whether the standard is an existing standard or a new standard to which a new function is added. That is, the ACA 114 is an area for recording a common information table which is applied commonly to all functions that are used by an existing standard and a new standard to which a new function is added. Each ACD item forms a common information table for each function. In other words, ACD #1 forms a common information table for "function 1", ACD #2 forms a common information table for "function 2", and ACD #3 forms a common information table for "function 3". Here, for example, function 1 may be a function that a drive system can recognize, and functions 2 and 3 may be functions that the drive system cannot recognize. Of course, each ACD item may also include individual information that can be recognized only by a drive system that recognizes the function of the ACD, as well as common information that can be recognized commonly by drive systems of all standards.

ACD #1 400 includes common information 410 and individual information 420. The common information 410 includes: an ACD_ID 411 that is an identifier to distinguish the ACD; formattability information 412 indicating whether or not formatting is possible; DMA recordability/reproducibility information 413 indicating whether recording data in DMA excluding DDS is possible or only reproducing data is possible; spare area recordability/reproducibility information 414 indicating whether recording data in a spare area is possible or only reproducing data is possible; user data area recordability/reproducibility 415 indicating whether recording data in a user data area is possible or only reproducing data is possible; reserved area #1 recordability/reproducibility information 416 indicating whether recording data in reserved area #1 is possible or only reproducing data is possible; and reserved area #2 recordability, reproducibility information 417 indicating whether recording data in reserved area #2 is possible or only reproducing data is possible. The formattability information 412, DMA recordability/reproducibility information 413, spare area recordability/reproducibility information 414, user data area recordability/reproducibility 415, reserved area #1 recordability/reproducibility information 416, and reserved area #2 recordability, reproducibility information 417 form the common information field.

By confirming the ACD_ID 411, a drive system can determine whether this ACD is about a function that is recognizable or unrecognizable. That is, if the ACD_ID 411 is an identifier known to the drive system, this ACD is about a function recognizable by the drive system, and if not known to the drive system, this ACD is about a function unrecognizable by the drive system.

Although the drive system cannot recognize the ACD_ID 411, by confirming the field included in the common information table, the drive system can perform a minimum operation appropriate to the unrecognizable function.

The format of ACD shown in FIG. 4 is a format to indicate fixed attribute information of the ACD itself according to the first embodiment of the present invention.

In the first embodiment, since ACD attribute information is included in the ACD_ID itself, ACD attribute information cannot be changed in the structure, and accordingly, the ACD attribute information is fixed. Fixed attribute information of the ACD itself indicates that when the ACD is generated, the attribute on whether the ACD should be deleted or should not be deleted or whether deletion of the ACD does not matter when the ACD is re-initialized is determined.

In other words, fixed attribute information of the ACD itself indicates that when the ACD is recorded, the attribute is determined such that when the ACD is re-initialized, changing the ACD is impossible. Of course, it is desirable that this fixed attribute information of the ACD itself is applied when the ACD is re-initialized and the function of the ACD is not known. This is because if the function is a known function, it is possible to modify the values in the ACD to fit a situation in which re-initialization is performed by a user or a drive system, and the function indicated by the ACD, or to delete the values when not necessary, but if the function is an unknown function, an appropriate value of information in the ACD cannot be set, making modification impossible, and an operation can be performed only by referring to values set in information items in common information that defines operations for unknown functions.

In the first embodiment of ACD according to aspects of the present invention, the ACD_ID 411 includes attribute information of the ACD itself. That is, by the ACD_ID 411, an identifier for a predetermined function is expressed, and also, attribute information of the ACD itself is expressed. This will now be explained with reference to FIG. 7.

Figure 7:
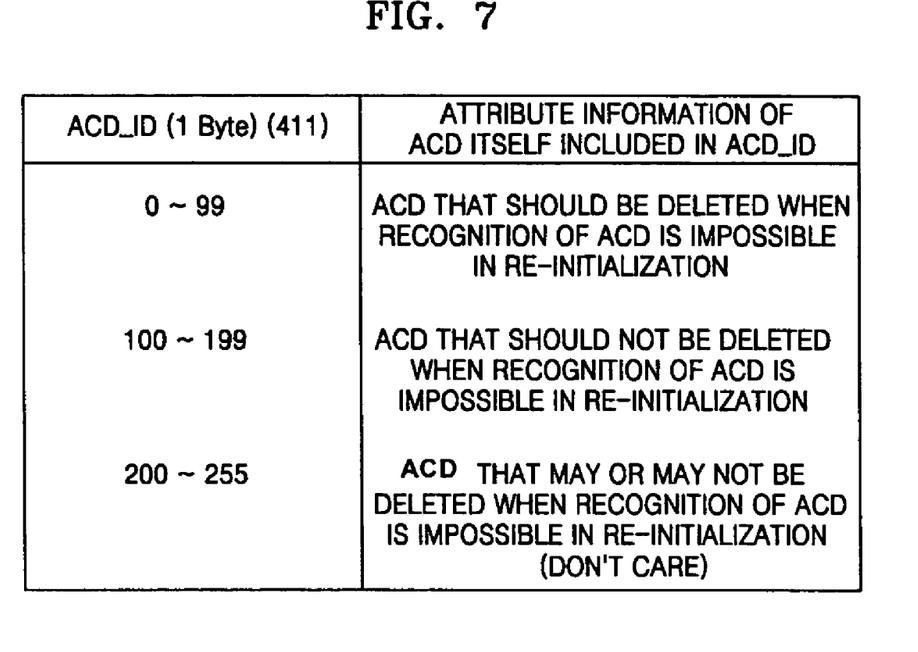
FIG. 7 is a reference diagram explaining ACD_ID including the meaning of attribute information of ACD itself in the first embodiment of the access control data shown in FIG. 4.

FIG. 7 is a reference diagram for explaining the ACD_ID 411 including the meaning of attribute information of the ACD itself in the first embodiment of the access control data shown in FIG. 4. Referring to FIG. 7, in a method indicating attribute information of the ACD itself, the ACD_ID 411 is classified into ACD items that should be deleted when a disc is re-initialized, ACD items that should not be deleted when the disc is re-initialized, and ACD items that it does not matter whether or not the ACD is deleted when the disc is re-initialized. For example, if it is assumed that the ACD_ID 411 is defined by 1 byte, then 256 identifiers can be formed. Among them, when the value of the ACD_ID 411 is any one of 0-99, it indicates ACD that should be deleted when the ACD is unrecognizable during re-initialization, and when the value of the ACD_ID 411 is any one of 100-199, it indicates ACD that should not be deleted when the ACD is unrecognizable during re-initialization, and when the value of the ACD_ID 411 is any one of 200-255, it indicates ACD that whether or not the ACD is deleted is irrelevant, when the ACD is unrecognizable during re-initialization.

Figure 5:
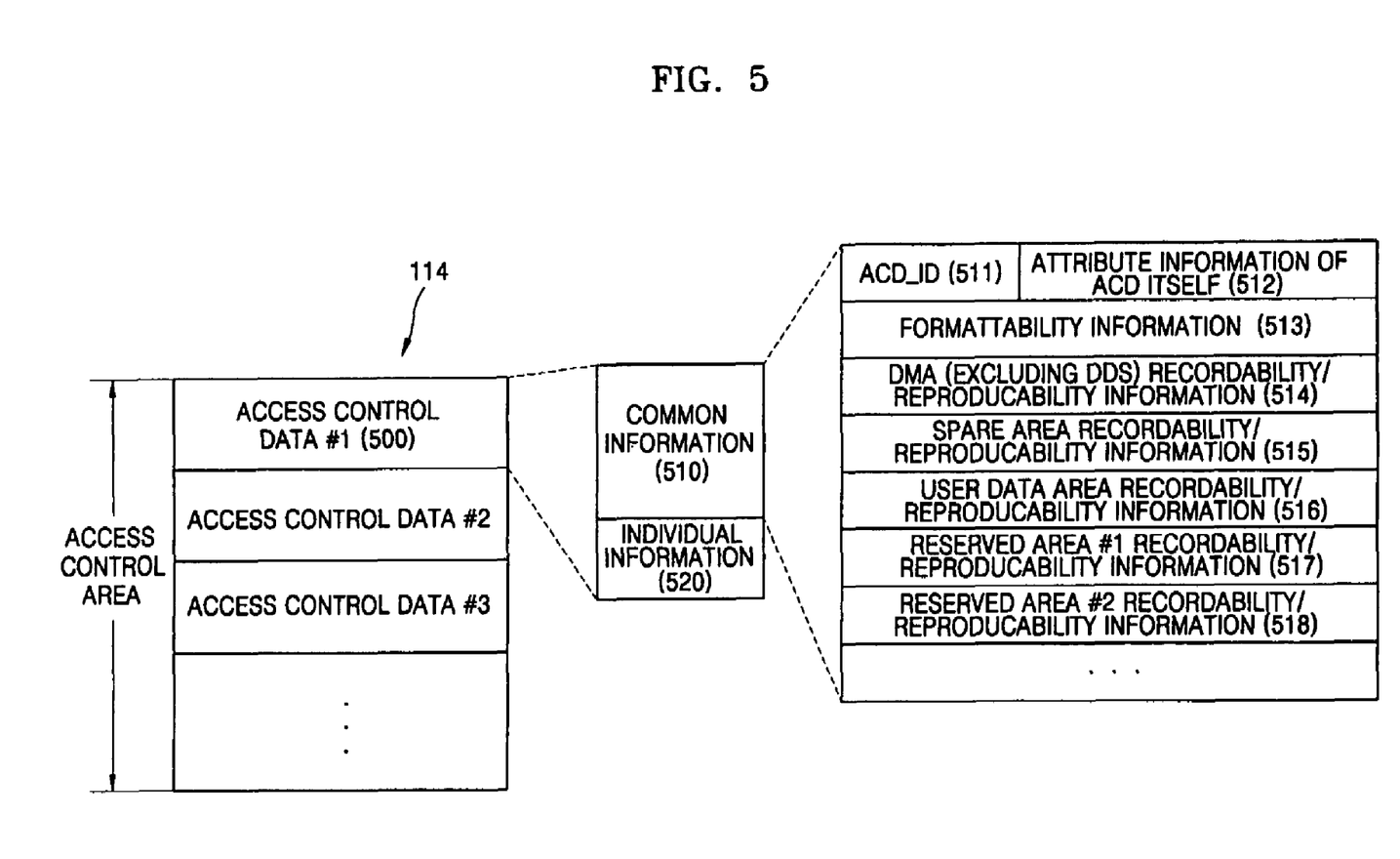
FIG. 5 is a detailed diagram of the structure of an access control area shown in FIG. 2 and showing a second embodiment of access control data according to the present invention.

FIG. 5 is a detailed diagram of the structure of the access control area (ACA) shown in FIG. 2 and showing a second embodiment of access control data (ACD).

In the second embodiment of the ACD, ACD attribute information is provided distinctively in a field to indicate information about the ACD, separately from the ACD_ID. Also in the second embodiment, ACD attribute information is fixed and cannot be changed. Referring to FIG. 5, an ACA 114 includes ACD #1, ACD #2, ACD #3 . . . ACD #1 500 includes common information 510 and individual information 520.

The common information 510 includes an ACD_ID 511 that is an identifier to distinguish the ACD, attribute information of the ACD itself 512, formattability information 513, DMA recordability/reproducability information 514 indicating whether recording data in DMA excluding DDS is possible or only reproducing data is possible, spare area recordability/reproducibility information 515, user data area recordability/reproducability information 516, reserved area #1 recordability/reproducability information 517, and reserved area #2 recordability/reproducibility information 518.

Figure 8:
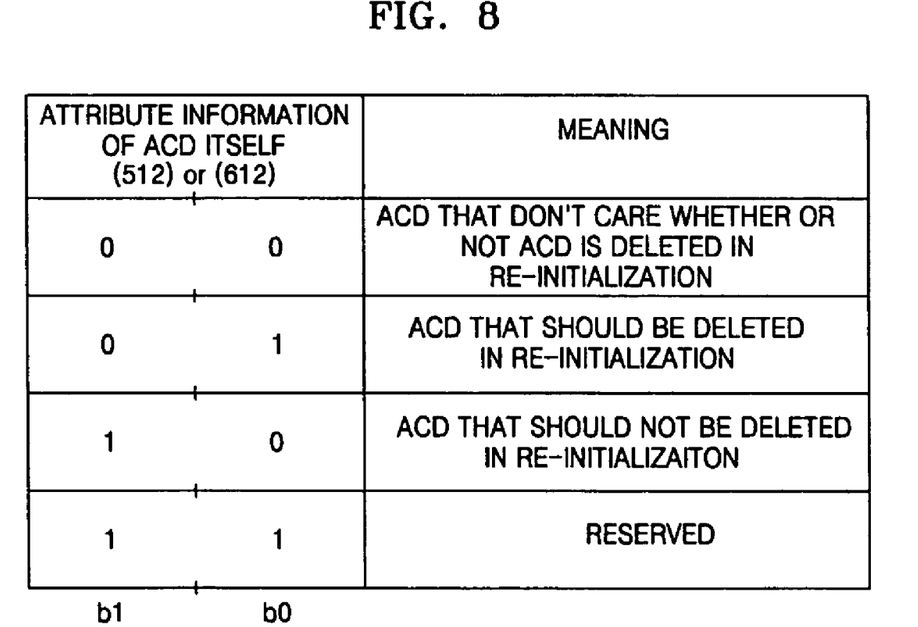
FIG. 8 is a reference diagram explaining an attribute information field of ACD itself shown in FIGS. 5 and 6.

FIG. 8 is a reference diagram for explaining attribute information of the ACD itself in the second embodiment of the ACD 500 shown in FIG. 5. Referring to FIG. 8, as a method to indicate attribute information of the ACD itself, by giving a fixed value separate from the ACD_ID 511 to ACD 500, the attribute information of the ACD itself 512 can be indicated. Since three types of attributes when re-initialization is performed are suggested above in aspects of the present invention with respect to the ACD 500, the value can be expressed by allocating 2 bits based on the types. For example, "00b" indicates ACD that it does not matter whether or not the ACD is deleted during re-initialization, "01b" indicates ACD that should be deleted during re-initialization, "10b" indicates ACD that should not be deleted during re-initialization, and "11b" is reserved for a future use.

Figure 6:
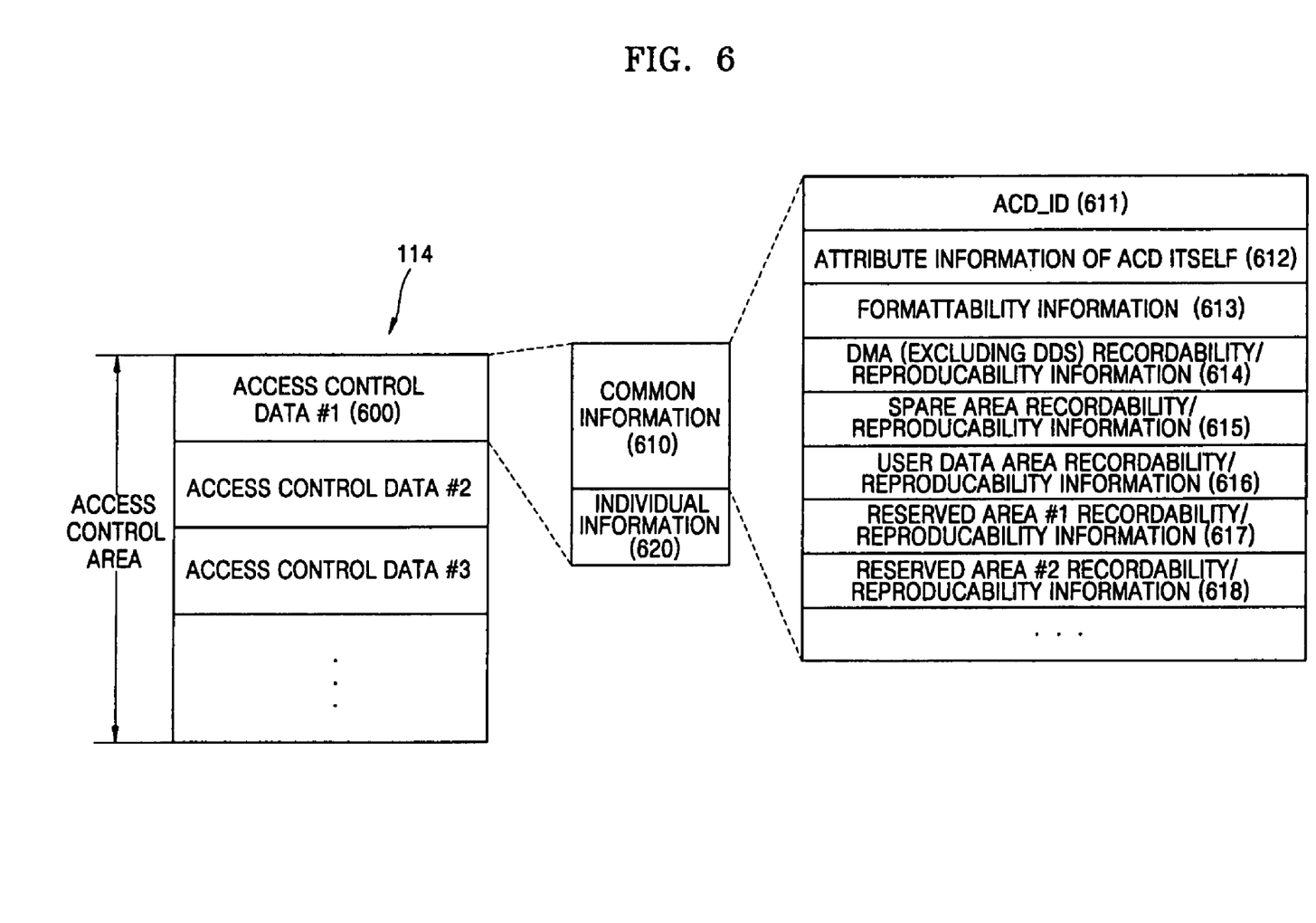
FIG. 6 is a detailed diagram of the structure of an access control area shown in FIG. 2 and showing a third embodiment of access control data according to the present invention.

FIG. 6 is a detailed diagram of the structure of the ACA 114 shown in FIG. 2 and showing a third embodiment of ACD. In the third embodiment of the ACD 600, ACD attribute information 612 is included as one field of the common information field 610 of the ACD 600. Since the ACD attribute information 612 is included in one field of the common information field 610, in the third embodiment, it is possible to change the ACD attribute information 612. Referring to FIG. 6, an ACA 114 includes ACD #1 600, ACD #2, ACD #3 . . . ACD #1 600 includes common information 610 and individual information 620.

The common information 610 includes an ACD_ID 611 that is an identifier to distinguish the ACD 600, attribute information of the ACD itself 612, formattability information 613, DMA recordability/reproducibility information 614 indicating whether recording data in DMA excluding DDS is possible or only reproducing data is possible, spare area recordability/reproducibility information 615, user data area recordability/reproducibility information 616, reserved area #1 recordability/reproducibility information 617, and reserved area #2 recordability/reproducibility information 618.

The format of the ACD 600 shown in FIG. 6 is a format to indicate attribute information of the ACD itself 612 that can be changed according to the third embodiment of the present invention. The attribute information of the ACD itself 612 that can be changed indicates that while the ACD 600 is being used, a value set in the ACD 600 is changed and determined, or the attribute information of the ACD itself 612 is changed and determined to fit a situation of a user or a drive system. In other words, the attribute information of the ACD itself 612 that can be changed indicates that during re-initialization, the attribute is determined to fit a situation occurring while the ACD 600 is used.

As in the second embodiment shown in FIG. 5, in a method indicating the attribute information of the ACD itself 612 of FIG. 6, 2 bits separate from the ACD_ID 611 are set to indicate the attribute information as shown in FIG. 8. For example, "00b" indicates ACD that it does not matter whether or not the ACD is deleted during re-initialization, "01b" indicates ACD that should be deleted during re-initialization, "10b" indicates ACD that should not be deleted during re-initialization, and "11b" is reserved for a future use.

However, in the second embodiment shown in FIG. 5, the attribute information of the ACD itself 512 is fixed information that is determined when the ACD 500 is generated and cannot be changed after that time. Meanwhile, the attribute information of the ACD itself 612 of FIG. 6 is one field of common information 610 defining operations for unknown functions, and indicates that values set in the ACD 600 can be changed and stored, or the attribute information of the ACD itself 612 can be changed and stored to fit the intention of a user or a situation of a drive system.

An example of ACD that should be deleted during re-initialization will now be explained.

It is assumed that a user records data on a medium on a drive system B and then, in order to set a "read protection" function for the recorded data, sets read protection for the data by recording read protection ACD on the medium. After that time, if the medium is loaded on a drive system A that cannot recognize read protection ACD and a new user desires to re-initialize this medium (of course, at this time, the state of this medium is set to a state where re-initialization is possible), the read protection ACD should be deleted. This is because if drive system A does not delete the read protection ACD during re-initialization, after the re-initialization, when data is recorded on the re-initialized disc and desired to be read, drive system A will operate according to values set in common information of the read protection ACD that is unknown to drive system A, because the read protection ACD is recorded in the ACA on this disc. However, since the purpose of the read protection ACD is to protect reproduction of data, if the function is not known to a drive system, the data cannot be reproduced, and even if the function is known to the drive system, the data can be reproduced only after passing a safety tool such as a password, but a new user will not know the password.

An example of ACD that should not be deleted during re-initialization will now be explained.

When a current standard A is set up, reserved areas can be disposed in order to guarantee scalability with respect to a future standard B. In this case, if in the future standard B, reserved area #1 116 shown in FIG. 2 is used as a "user specific area", the area is used, for example, to store information for efficiently using the disc for one person or a plurality of users, or to store information appropriate to the characteristics of users. Also, when it is assumed that user specific ACD for the "user specific area" is generated, if the medium on which the user specific ACD is recorded is loaded on drive system A that cannot recognize the user specific ACD, the user specific ACD should not be deleted when the disc is re-initialized. This is because in order to define an operation for a drive system that cannot recognize this function, an appropriate value (recording and/or reproducing prohibition) is already set in information on whether or not recording and/or reproducing in reserved area #1 116 is possible, in the common information of the user specific ACD, and therefore, even if this ACD is not deleted during re-initialization, no problem will occur, and also, if it is maintained without change, after that time, when the re-initialized disc is loaded on a drive system that recognizes the user specific ACD, the user can utilize this function.

Figure 9:
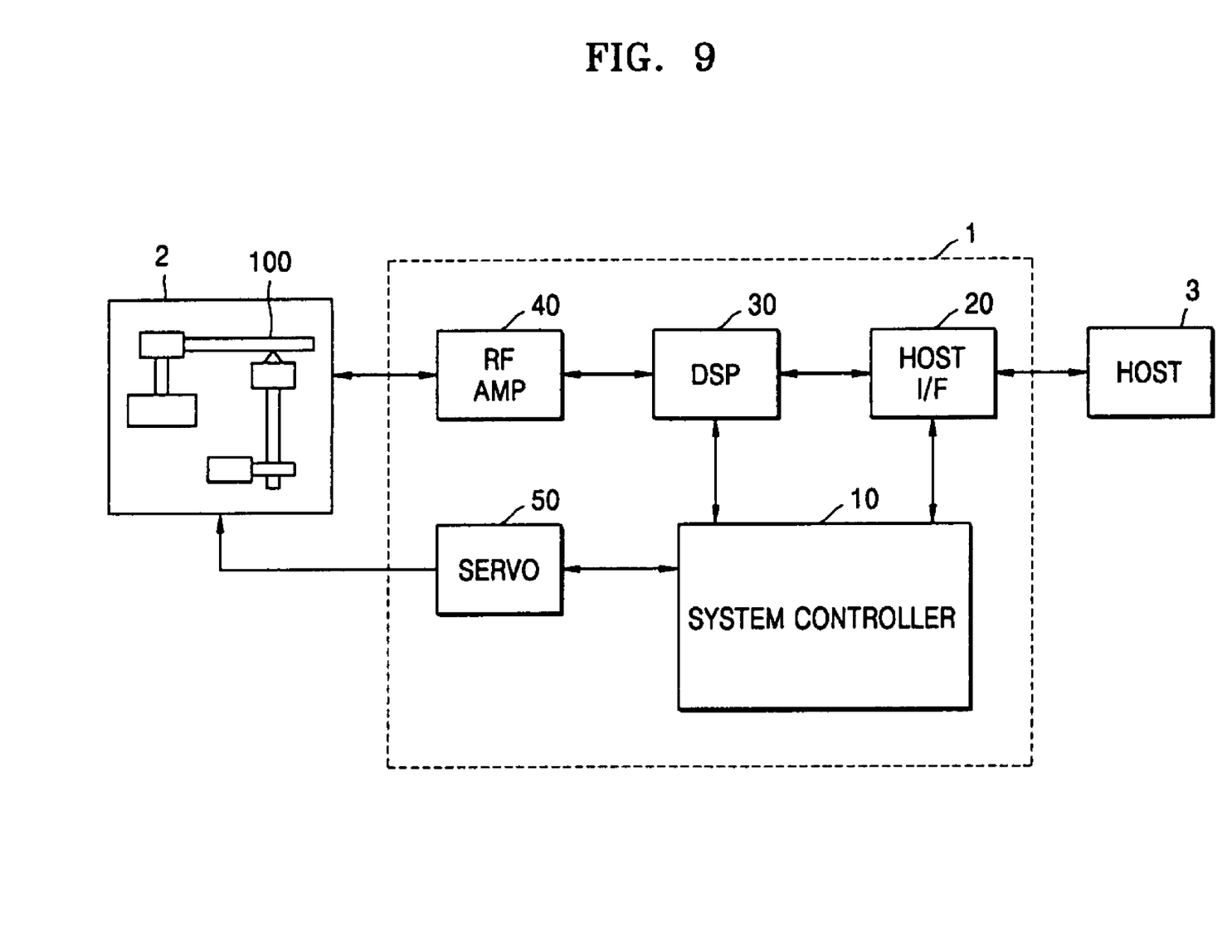
FIG. 9 is a schematic block diagram of a recording and/or reproducing apparatus performing initialization or re-initialization according to an embodiment of the present invention.

FIG. 9 is a schematic block diagram of a recording and/or reproducing apparatus performing re-initialization according to aspects of the present invention as shown in FIGS. 2-8. Referring to FIG. 9, the recording and/or reproducing apparatus includes a writing/reading unit 2 and a control unit 1.

The writing/reading unit 2 has a pickup and other parts and writes data on a disc 100 that is an optical recording information storage medium to which aspects of the present invention are applied, and reads data recorded on the disc 100.

The control unit 1 controls the writing/reading unit 2 such that data is recorded on and read from the disc 100 according to a predetermined file system. In particular, when an empty disc is loaded, the control unit 1 according to aspects of the present invention controls the writing/reading unit 2 such that initialization is performed, and when an already used disc 100 is loaded, the control unit 1 controls the writing/reading unit 2 such that re-initialization is performed. The control unit 1 includes a system controller 10, a host I/F 20, a DSP 30, an RF AMP 40 and a servo 50.

When data is recorded, the host I/F 20 receives a predetermined write command from a host 3 and transmits the command to the system controller 10. The system controller 10 controls the DSP 30 and the servo 50 in order to perform this write command received from the host I/F 20. For error correction, the DSP 30 adds additional data, such as a parity, to the data received from the host I/F 20 and to be recorded, performs error correction code (ECC) encoding to generate an ECC block that is an error correction block, and then modulates the generated ECC block in a predetermined method. The RF AMP 40 converts the data output from the DSP 30 into an RF signal. The writing/reading unit 2 having a pickup records the RF signal transmitted by the RF AMP 40 on the disc 100. The servo 50 receives a command input required for servo control from the system controller 10 and servo controls the pickup of the writing/reading unit 2. In particular, according to aspects of the present invention, the system controller 10 forms ACD to include ACD attribute information, and the formed ACD is recorded in an ACA disposed on the disc 100. This ACD attribute information can be indicated after being made to be included in the ACD_ID as shown in FIG. 4, or can be included as one field of common information of ACD as shown in FIGS. 5 and 6. Also, when the disc 100 is re-initialized, by referring to this ACD attribute information, the system controller 10 can determine whether or not to delete the ACD.

When data is reproduced, the host I/F 20 receives a reproduction command from the host 3. The system controller 10 performs initialization required for reproduction. The writing/reading unit 2 irradiates a laser beam on the disc 100, and outputs an optical signal obtained by receiving the laser beam reflected from the disc 100. The RF AMP 40 converts the optical signal output from the writing/reading unit 2 into an RF signal, and provides modulated data obtained from the RF signal to the DSP 30, while providing a servo signal for control obtained from the RF signal, to the servo 50. The DSP 30 demodulates the modulated data and outputs data obtained through ECC error correction. Meanwhile, the servo 50 receives a servo signal from the RF AMP 40 and a command required for servo control received from the system controller 10, and performs servo control for the pickup. The host I/F 20 transmits data received from the DSP 30 to the host 3. In order to control reproduction, the system controller 10 controls the servo 50 such that disc management information or information on defects is read from the disc 100 and from a position from which data without defects is recorded, data is read.

The recording and/or reproducing apparatus shown in FIG. 9 can be implemented as a separate recording apparatus and a reproducing apparatus, or as one recording and reproducing apparatus.

Figure 10:
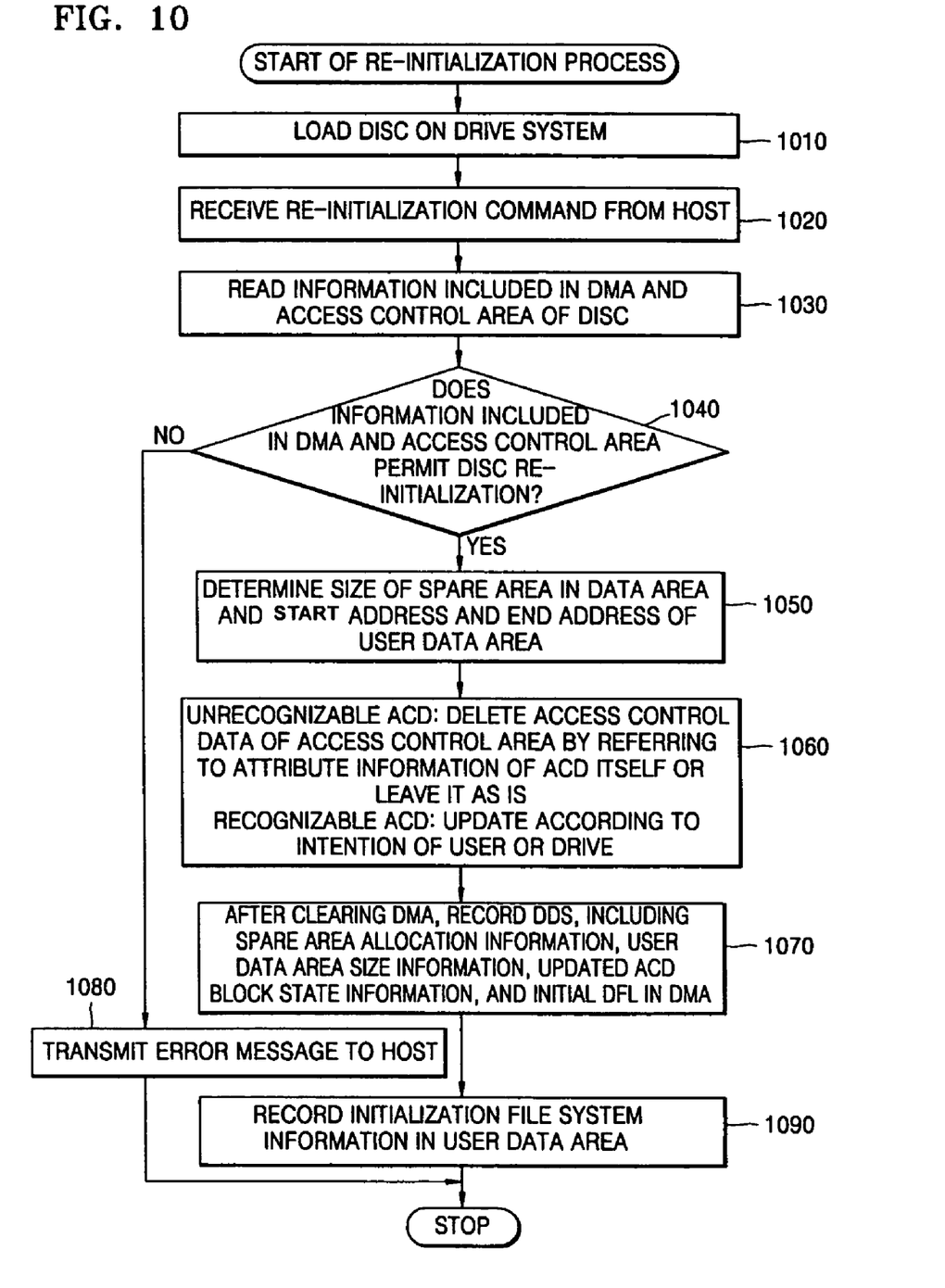
FIG. 10 is a flowchart of a method for re-initialization according to an embodiment of the present invention.

FIG. 10 is a flowchart of a method for re-initialization according to aspects of the present invention. Referring to FIGS. 9 and 10, first, an already used disc 100 is loaded on a drive system in operation 1010. The system controller 10 of the drive system receives a disc re-initialization command from a host 3 through a host I/F 20 in operation 1020.

Then, the system controller 10 controls a writing/reading unit 2 such that information in a defect management area (DMA) and an ACA disposed in a lead-in area of the disc 100 is read, and fetches this information in operation 1030, and determines whether or not these information items indicate that re-initialization of the disc 100 is permitted in operation 1040.

If the determination result of the system controller 10 indicates that re-initialization is not permitted, an error message is transmitted to the host 3 through the host I/F 20 in operation 1080.

However, if the determination result of the system controller 10 indicates that re-initialization is permitted, the system controller 10 allocates a spare area in a data area of the disc 100, determines the size of the spare area, allocates a user data area in which user data is recorded, in the data area, and determines the start address and end address of the user data area in operation 1050.

The system controller 10 performs re-initialization related to the read ACA. That is, ACD in the ACA may be deleted, or may not be deleted, or may be updated. More specifically, according to aspects of the present invention, if the ACD is unrecognizable, the system controller 10 deletes or maintains the ACD by referring to the attribute information of ACD itself. The attribute information of the ACD itself is the same as described above with reference to FIGS. 7 and 8. If the ACD is recognizable, the ACD may be updated or deleted according to the intention of the user or the drive system.

Also, after the ACD is thus deleted or changed, according to this, ACD state information included in a disc definition structure (DDS) of the disc 100 is updated. Since when the ACD is updated or changed, valid data is still included in the ACD block, the ACD state information can be maintained without change. When the ACD is deleted, the ACD state information is updated by information indicating a state that valid data is not included in this ACD block any more, and a new ACD block can be recorded.

Then, the system controller 10 clears a defect management area (DMA) in the lead-in area of the disc 100, and then, controls the writing/reading unit 2 and the servo 50 such that the DDS, including the spare area allocation information, the size information of the user data area, and the updated ACD block state information, and an initial defect list (DFL), are recorded in the DMA in operation 1070.

Then, in order to re-initialize management information for data recorded in the user data area, the system controller 10 controls the writing/reading unit 2 such that a recorded file system is re-initialized by a write command of the host and recorded in the user data area of the disc 100 in operation 1090.

The recording method and re-initialization method as described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention as described above, when the disc is re-initialized, by recording common information in relation to disc access control which even a drive system with a different standard can know, a drive system that cannot recognize a function applied to the disc as well as a drive system that can recognize the function can perform an appropriate operation by referring to this common information, such that compatibility of the disc can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium for use with a recording and/or reproducing apparatus, the information storage medium comprising:

an access control area used to store access control data (ACD) having common information which the recording and/or reproducing apparatus uses to control access to the medium when a predetermined function applied to the medium is unrecognizable, the ACD including ACD attribute information providing information indicating to the recording and/or reproducing apparatus whether to delete the ACD when the medium is re-initialized.

2. The information storage medium of claim 1, wherein the ACD attribute information includes at least one of information indicating to the recording and/or reproducing apparatus that the ACD should be deleted when the medium is re-initialized, information indicating that the ACD should not be deleted, or information indicating to the recording and/or reproducing apparatus that deletion of the ACD does not matter.

3. The information storage medium of claim 1, wherein the ACD attribute information is fixed when the ACD is generated, or is changeable while the ACD is used by the recording and/or reproducing apparatus.

4. The information storage medium of claim 3, wherein to fix the ACD attribute information, the ACD attribute information is included in an identifier identifying the predetermined function indicated by the ACD.

5. The information storage medium of claim 3, wherein to allow the ACD attribute information to be changed, the ACD attribute information is included in the common information of the ACD.

6. The information storage medium of claim 3, wherein when the medium is re-initialized, if the ACD attribute information of the ACD that is unrecognizable indicates to the recording and/or reproducing apparatus that the unrecognizable ACD should be deleted, the unrecognizable ACD is deleted in the access control area, and if the ACD attribute information of the ACD that is unrecognizable indicates to the recording and/or reproducing apparatus that the unrecognizable ACD should not be deleted, the unrecognizable ACD is not deleted.

7. A recording and/or reproducing apparatus, comprising:
a writing/reading unit writing data on or reading data from an information storage medium comprising an access control area used to store access control data (ACD) having common information which the recording and/or reproducing apparatus uses to control access to the medium when a predetermined function indicated by the ACD is unrecognizable by the recording and/or reproducing apparatus; and
a control unit controlling the writing/reading unit to write the ACD including the ACD attribute information providing information indicating whether to delete the ACD during a re-initialization operation of the medium on the medium.

8. The apparatus of claim 7, wherein the ACD attribute information includes at least one of information indicating that the ACD should be deleted when the medium is re-initialized by the recording and/or reproducing apparatus, information indicating that the ACD should not be deleted, or information indicating that deletion of the ACD does not matter.

9. The apparatus of claim 7, wherein the ACD attribute information is fixed when the ACD is generated, or is changeable while the ACD is used.

10. The apparatus of claim 9, wherein in order to fix the ACD attribute information, the ACD attribute information is included in an identifier identifying the predetermined function indicated by the ACD.

11. The apparatus of claim 9, wherein in order to allow the ACD attribute information to be changed, the ACD attribute information is included in the common information of the ACD.

12. The apparatus of claim 8, wherein the control unit further controls the writing/reading unit such that when the medium is re-initialized by the recording and/or reproducing apparatus, if the ACD attribute information of the ACD that is unrecognizable indicates that the unrecognizable ACD should be deleted, the unrecognizable ACD is deleted in the access control area, and if the ACD attribute information of the ACD that is unrecognizable indicates that the unrecognizable ACD should not be deleted, the unrecognizable ACD is not deleted in the access control area.

13. A method of recording and/or reproducing data, comprising:
recording access control data (ACD) including ACD attribute information providing information indicating whether to delete the ACD during a re-initialization operation of an information recording medium by a recording and/or reproducing apparatus, the medium comprising an access control area used to store the ACD having common information, which is set so that even when the recording and/or reproducing apparatus cannot recognize a predetermined function applied to the medium the recording and/or reproducing apparatus controls access to the medium.

14. The method of claim 13, wherein the ACD attribute information includes at least one of information indicating that the ACD should be deleted when the medium is re-initialized, information indicating that the ACD should not be deleted, or information indicating that deletion of the ACD does not matter.

15. The method of claim 13, further comprising:
fixing the ACD attribute information when the ACD is recorded; or changing the ACD attribute information while the ACD is used.

16. The method of claim 15, wherein the fixing the ACD attribute information, comprises including the ACD attribute information in an identifier identifying the predetermined function indicated by the ACD.

17. The method of claim 15, wherein the changing the ACD attribute information, comprises including the ACD attribute information in the common information of the ACD.

18. The method of claim 14, wherein the recording further comprises:
deleting an unrecognizable ACD in the access control area when the medium is re-initialized, if the ACD attribute information of the ACD that is unrecognizable indicates that the unrecognizable ACD should be deleted and leaving the unrecognizable ACD not deleted in the access control area if the ACD attribute information of the ACD that is unrecognizable indicates that the unrecognizable ACD should not be deleted.

19. A method of re-initializing an information storage medium using a recording and/or reproducing apparatus, the information storage medium including a lead-in area, a data area and a lead-out area, comprising:
reading a disc management area and an access control area of the information storage medium;
determining a size of at least one spare area in the data area and a start and end address of a user data area in the data area;
reading access control data (ACD) including ACD attribute information from the access control area;
re-initializing the ACD according to whether the ACD is recognizable by the recording and/or reproducing apparatus and according to the ACD attribute information; and
deleting the disc management area, writing a new disc management area including the re-initialized ACD, and allocating the at least one spare area and the user data area in the data area of the information storage medium.

20. The method of claim 19, wherein the re-initializing the ACD comprises:
- deleting the ACD in the access control area when the information storage medium is re-initialized when the ACD is not recognizable and the ACD attribute information indicates that the unrecognizable ACD should be deleted; and
- maintaining the ACD in the access control area when the information storage medium is re-initialized when the ACD is not recognizable and the ACD attribute information indicates that the unrecognizable ACD should not be deleted.

21. The method of claim 19; wherein the re-initializing the ACD comprises:
- updating the ACD in the access control area when the information storage medium is re-initialized when the ACD is recognizable according to the ACD attribute information and a user or the recording and/or reproducing apparatus.

22. The method of claim 19, wherein the ACD attribute information includes at least one of information indicating to delete the ACD when the medium is re-initialized, information indicating not to delete the ACD, or information indicating that deletion of the ACD is irrelevant.

23. The method of claim 19, wherein the writing the new disc management area further comprises:
- updating an ACD state block in the new disc management area, the ACD state block indicating a recording state and/or a defect state of each ACD block in the access control area storing the ACD.

24. The method of claim 23, wherein the ACD state block indicates one of the ACD block is usable for the ACD, the ACD block is defective, the ACD block includes the ACD which is compromised, or the ACD block includes the ACD and is usable.

25. The method of claim 23, wherein the updating the ACD state block comprises recording the ACD state block in a disc definition structure area in the new disc management area of the information storage medium.

26. An information storage medium for use with a recording and/or reproducing apparatus, the information storage medium comprising:
- an access control area which stores access control data (ACD) which the recording and/or reproducing apparatus uses to control access to the medium when a predetermined function of the medium is unrecognized by the recording and/or reproducing apparatus, the ACD including ACD attribute information indicating to the recording and/or reproducing apparatus a status of the ACD during re-initialization of the information storage medium.

27. The information storage medium of claim 26, wherein the access control area is disposed in at least one of a lead-in area or a lead-out area of the information storage medium.

28. The information storage medium of claim 26, wherein the ACD attribute information includes at least one of information indicating to the recording and/or reproducing apparatus to delete the ACD during the re-initialization, information indicating to the recording and/or reproducing apparatus not to delete the ACD during the re-initialization, or information indicating to the recording and/or reproducing apparatus that deletion of the ACD is irrelevant during the re-initialization.

29. The information storage medium of claim 26, wherein the ACD further comprises an ACD identifier to distinguish each ACD, formattability information indicating whether formatting of the information storage medium by the recording and/or reproducing apparatus is permissible, DMA recordability/reproducibility information indicating whether the recording and/or reproducing apparatus records and reproduces data in the DMA or only reproduces the data in the DMA, spare area recordability/reproducibility information indicating whether the recording and/or reproducing apparatus records and reproduces spare data in a spare area or only reproduces the spare data, user data area recordability/reproducibility indicating whether the recording and/or reproducing apparatus records and reproduces user data in a user data area or only reproduces the user data; reserved area recordability/reproducibility information indicating whether the recording and/or reproducing apparatus records and reproduces reserved data in a reserved area or only reproduces the reserved data.

30. The information storage medium of claim 29, wherein the ACD attribute information is stored in the ACD identifier.

31. The information storage medium of claim 29, wherein the ACD attribute information is stored in a field separate from the ACD identifier.

32. The information storage medium of claim 29, wherein the ACD attribute information is stored in common information of the access control area.

* * * * *